United States Patent [19]

Reiter et al.

[11] 4,429,072

[45] Jan. 31, 1984

[54] PREPARATION OF AQUEOUS THERMOSETTING ELECTRICAL INSULATING VARNISHES, AND USE OF THE VARNISHES

[75] Inventors: Udo Reiter, Mutterstadt; Helmut Lehmann, Reinbek, both of Fed. Rep. of Germany

[73] Assignee: BASF Aktiengesellschaft, Fed. Rep. of Germany

[21] Appl. No.: 419,494

[22] Filed: Sep. 17, 1982

[30] Foreign Application Priority Data

Sep. 19, 1981 [DE] Fed. Rep. of Germany ....... 3137385

[51] Int. Cl.$^3$ .................. B32B 15/00; C09D 3/64; C09D 5/25; H01B 3/42
[52] U.S. Cl. .................. 524/591; 428/458; 528/288; 528/289; 528/322
[58] Field of Search .......... 524/591; 428/458; 528/288, 289, 322

[56] References Cited

U.S. PATENT DOCUMENTS

| | | | |
|---|---|---|---|
| 3,425,866 | 2/1969 | Meyer et al. | 428/383 |
| 3,426,098 | 2/1969 | Meyer et al. | 428/458 |
| 4,018,736 | 4/1977 | Fabian et al. | 528/288 |
| 4,104,221 | 8/1978 | Janssen et al. | 524/602 |
| 4,206,261 | 6/1980 | Laganis et al. | 428/458 |
| 4,307,226 | 12/1981 | Bolon et al. | 528/288 |

FOREIGN PATENT DOCUMENTS

| | | | |
|---|---|---|---|
| 1445263 | 7/1971 | Fed. Rep. of Germany | 528/289 |
| 973377 | 10/1964 | United Kingdom | 528/289 |

*Primary Examiner*—Ronald W. Griffin
*Attorney, Agent, or Firm*—Keil & Witherspoon

[57] ABSTRACT

A process for the preparation of aqueous thermosetting electrical insulating varnishes, wherein polyester-imide precondensates are prepared by condensing aromatic tricarboxylic acid monoanhydrides, diamines, diols, triols containing an isocyanurate ring, and cyclic trimerization products of diisocyanates, whose free isocyanate groups are blocked, with or without aromatic dicarboxylic acids or their esterifiable derivatives, and are reacted, at from 50° to 200° C., with or without addition of from 1 to 10% by weight, based on polyester-imide, of a polar organic solvent, with ammonia or an organic amine, and then diluted with fully demineralized water, with or without addition of a water-soluble curing catalyst. The novel electrical insulating varnishes are used as wire enamels or impregnating varnishes.

13 Claims, No Drawings

PREPARATION OF AQUEOUS THERMOSETTING ELECTRICAL INSULATING VARNISHES, AND USE OF THE VARNISHES

The present invention relates to a process for the preparation of aqueous thermosetting electrical insulating varnishes based on polyester-imides, and to their use as wire enamels and impregnating varnishes.

German Published Application DAS No. 1,645,435 discloses that the heat resistance of polyester-imide (=PEI) wire enamels may be raised by adding cyclic trimers of diisocyanates, in which the free isocyanate groups are blocked with phenols or cresols, for example trimers of 2,4-tolylene diisocyanate, which are blocked with phenol. The polyester-imide resin used was prepared according to German Published Application DAS No. 1,445,263, the precondensate being dissolved in a solvent or solvent mixture, eg. cresol, xylene, xylenol and/or solvent naphtha. Trimers of diisocyanates, in which the free isocyanate groups are blocked, may be added to the resulting enamels, which usually have a solids content of from 20 to 30%, since these trimers are also soluble in the same solvents. Copper wires enameled with these compositions show improved properties, particularly in respect of heat shock and scorching resistance, compared to the pure tris-(2-hydroxyethyl) isocyanurate (=THEIC)-modified PEI wire enamels. However, these enamels exhibit substantial disadvantages, since they are uneconomical—due to the low solids content of from about 20 to 30% and the use of expensive solvents—and since the solvents employed have a very unpleasant odor. To avoid environmental pollution, and for reasons of factory hygiene, very expensive equipment for combusting the solvent vapor are therefore needed.

It is therefore desirable to have available nonpolluting systems. An aqueous varnish is particularly non-polluting and inexpensive.

If it is desired to prepare an aqueous varnish having the same properties as those described above, it is not possible simply to adopt the conventional method of preparation. The component responsible for improving the properties cannot be added to an aqueous varnish prepared beforehand, since this component is not water-soluble.

It is an object of the present invention to provide a process for the preparation of aqueous PEI varnishes which does not suffer from the above disadvantages and gives aqueous varnishes which can be converted to coatings having particularly advantageous properties.

We have found, surprisingly, that this object is achieved in a particularly advantageous manner by co-condensing, in the preparation of the polyester-imide precondensate, a cyclic trimerization product of a diisocyanate whose free isocyanate groups are blocked.

Accordingly, the present invention relates to a process for the preparation of aqueous thermosetting electrical insulating varnishes based on polyester-imides, which are obtained by condensing aromatic tricarboxylic acid monoanhydrides, diamines, diols and triols containing an isocyanurate ring, with or without aromatic dicarboxylic acids or their esterifiable derivatives, wherein (A) an aromatic tricarboxylic acid monoanhydride,
(B) an aromatic diamine,
(C) a triol containing an isocyanurate ring,
(D) an aliphatic diol and
(E) a cyclic trimerization product of a diisocyanate, whose free isocyanate groups are blocked, with or without
(F) an aromatic dicarboxylic acid or its esterifiable derivatives are co-condensed at from 120° to 240° C., the precondensate thus obtained is reacted—with or without addition of from 1 to 10% by weight, based on polyester-imide precondensate, of a polar organic solvent boiling above 100° C. under atmospheric pressure—with ammonia or an organic amine at from 50° to 200° C., the product is then diluted with fully demineralized water and, if appropriate, a water-soluble curing catalyst is added.

The present invention further relates to the use of the aqueous electrical insulating varnishes, prepared according to the invention, as wire enamels or impregnating varnishes.

Using the process according to the invention, an aqueous varnish having excellent properties can be prepared in a simple manner. The varnish solutions are of from about 45 to 55% strength and can be used, for example after addition of a conventional water-soluble curing catalyst, for enameling copper wires by means of conventional application systems and apparatus.

The enameled wires obtained using the aqueous PEI varnishes prepared by the process according to the invention exhibit substantially improved scorching resistance and substantially better heat shock resistance than wires bearing conventional THEIC-PEI enamels. The scorching resistance of the wire enameling obtained using the novel aqueous varnishes is even better than that obtained with THEIC-PEI varnishes dissolved in organic solvents and containing, as property-improving components, cyclic trimers of diisocyanates whose free isocyanate groups are blocked.

The following details may be noted concerning the starting components and materials used in the novel process.

(A) Suitable aromatic tricarboxylic acid monoanhydrides (A) are, for example, trimellitic anhydride, 3,4,3'-benzophenonetricarboxylic acid anhydride and hemimellitic anhydride, the first-mentioned being preferred.

(B) Preferred suitable aromatic diamines (B) are those with primary amino groups bonded to aromatic groups, for example those of the general formula

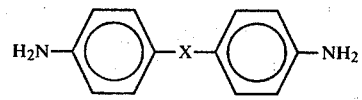

where X is a divalent radical, for example —CH$_2$—, —O—, —CO—, —S— or —SO$_2$—. Examples of such diamines are diaminodiphenylmethane, diaminodiphenyl ether and benzophenonediamine.

(C) Suitable triols containing an isocyanurate ring, (C), are tris-hydroxyethyl isocyanurate (=THEIC) and trishydroxypropyl isocyanurate, the first-mentioned being particularly preferred. If desired, minor amounts, namely up to 10 mole % based on the total triols, of other triols, for example glycerol, may be used at the same time.

(D) Suitable diols (D) are conventional divalent aliphatic alcohols, eg. butane-1,4-diol, trimethylene glycol and, preferably, ethylene glycol.

(E) Suitable cyclic trimerization products (E) of diisocyanates, whose free isocyanate groups are blocked, are trimerization products of conventional aromatic diisocyanates, for example the trimerization product of 2,4-toluylene diisocyanate, wherein the residual isocyanate groups are blocked (for example ®Desmodur CT stabil from Bayer AG). Examples of suitable blocking agents are OH-acidic compounds, of which phenol and cresols are preferred.

(F) Suitable aromatic dicarboxylic acids and their esterifiable derivatives (F), which are used as an optional component, are, for example, terephthalic acid, isophthalic acid, benzophenone-4,4'-dicarboxylic acid and esters of aromatic dicarboxylic acids, eg. with alcohols of 1 to 3 carbon atoms, eg. dimethyl terephthalate, dimethyl isophthalate and diethyl terephthalate.

In preparing the precondensates, the components (A) to (C) and (F) are in general employed in the molar ratio of (A):(B):(C):(F) of $2.2-1.8/1/0.5-1.5/0-0.5$, preferably $2.1-1.9/1/0.7-0.8/0-0.2$.

Component (E) is in general employed in an amount of from 5 to 15, preferably from 10 to 14, percent by weight based on the total amount of components (A)+(B)+(C)+(F). The component (D) also used in the preparation of the novel precondensates at the same time serves as the solvent and is in general employed in amounts of from 20 to 200, preferably from 40 to 100, percent by weight based on the total amount of components (A)+(B)+(C)+(E)+(F).

The precondensates to be employed according to the invention are in general prepared at from 120° to 240° C., preferably from 140° to 210° C. Component (D), the aliphatic diol, is present in the precondensate resin partly in a co-condensed form and partly in the free form.

Water formed during precondensate formation, blocking agents split off, and excess diol are removed by distillation.

The preparation of the precondensate is complete when the resin has a kinematic viscosity of $\mu = 16-32$ mm$^2$·sec$^{-1}$ (measured on a 2:1 N-methylpyrrolidone/resin solution using an Ubbelohde viscometer No. 3 at 30° C.).

From 1 to 10% by weight of a polar, preferably water-miscible, organic solvent which boils above 100° C. under atmospheric pressure may also be added to the precondensate. Examples of suitable solvents are N-methylpyrrolidone, glycols, eg. ethylene glycol, glycol ethers, eg. butylglycol, methyldiglycol, ethyldiglycol and butyldiglycol, and other polar solvents, eg. dimethylformamide or dimethylacetamide.

According to the invention, the PEI precondensate is reacted, at from 50° to 200° C., preferably from 90° to 150° C., with ammonia, preferably aqueous ammonia, or an organic amine, for example an alkanolamine, and the product is then diluted with fully demineralized water to a viscosity of from about 100 to about 10,000 mPa.s.

The PEI precondensate solution, which advantageously is cooled to 20°-50° C., can additionally be mixed with from 0.1 to 5, preferably from 2 to 4, % by weight, based on PEI precondensate, of a water-soluble curing catalyst. Preferred catalysts of this type are water-soluble titanium compounds, for example titanium tetralactate or triethanolamine titanate.

In this form, the polyester-imide solutions prepared according to the invention can be used directly as wire enamels, for example for copper wires, or as impregnating varnishes for enameled wire windings. The conventional application methods and apparatus can be employed.

The enamelings and impregnation are in general baked at from 200° to 550° C., preferably from 400° to 520° C.

The aqueous thermosetting polyester-imide varnishes prepared according to the invention have a good shelf life, are completely clear (bright) and do not exhibit an unpleasant odor. The enamels and varnishings obtained exhibit excellent properties, also in respect of heat shock and of heat-aging (scorching resistance). Particular advantages of the aqueous PEI varnishes prepared according to the invention are that they are non-polluting, are simple and safe to handle and, at the application viscosity, have a high solids content (of above 50 percent by weight).

In the Examples which follow, parts and percentages are by weight, unless stated otherwise.

EXAMPLE 1

256 parts of trimellitic anhydride, 132 parts of diaminodiphenylmethane, 121.8 parts of tris-(2-hydroxyethyl)-isocyanurate, 60.5 parts of a phenol-blocked trimer of 2,4-toluylene diisocyanate and 800 parts of ethylene glycol are introduced into a reaction vessel equipped with a stirrer, distillation attachment and internal thermometer. The temperature is then raised to 200° C. over 8 hours, in the course of which 375 parts of material distil off. Subsequently, a further 367 parts are distilled off under reduced pressure (120 mbar). A precondensate having a kinematic viscosity of 22 m$^2$.s$^{-1}$ (measured in a solution of 1 part of resin and 2 parts of N-methylpyrrolidone, using an Ubbelohde viscometer No. 3 at 30° C.) is obtained. The mixture is cooled to 110° C., 26.4 parts of N-methylpyrrolidone are introduced, and thereafter 253.6 parts of ammonia (25% strength aqueous solution) are added over 1 hour. The product is diluted with 85 parts of fully demineralized water to a use viscosity of 65 seconds (DIN cup, 4 mm nozzle), corresponding to a solids content of 54.0% (determined after 1 hour at 180° C.). 21 parts of titanium tetralactate are then added. The varnish obtained is used to enamel 0.5 mm copper wire on a conventional wire-enameling machine (oven length 2.50 m, oven temperature 460° C.).

The enameled wire was tested according to DIN No. 46,453:

| | | |
|---|---|---|
| Scorching time | 350° C. | 1,968 min |
| | 370° C. | 780 min |
| | 390° C. | 332 min |
| | 420° C. | 172 min |
| Heat shock, 10% VD, 1 × D, | 250° C. | satisfactory |
| Heat/pressure | 330° C. | |

EXAMPLE 2

1,080 parts of trimellitic anhydride, 556 parts of diaminodiphenylmethane, 514 parts of tris-hydroxyethyl isocyanurate, 255 parts of a phenol-blocked trimer of 2,4-toluylene diisocyanate and 1,546 parts of ethylene glycol are introduced into a conventional condensation vessel. The temperature is then raised to 200° C. over 8 hours, in the course of which 650 parts of material distil off. A further 747 parts are then distilled off under reduced pressure (70 mbar). A precondensate having a kinematic viscosity of 24 mm$^2 \cdot$s$^{-1}$ (measured in a solution of 1 part of resin and 2 parts of N-methylpyrrolidone, using an Ubbelohde viscometer No. 3 at 30° C.) is obtained. The mixture is cooled to 130° C., 79 parts of N-methylpyrrolidone are introduced, and 1,060 parts of ammonia (25% strength aqueous solution) are then added over 1 hour. The product is diluted with 1,260 parts of fully demineralized water to a use viscosity of 60 seconds (DIN cup, 4 mm nozzle), corresponding to a solids content of 50.0% (determined after 1 hour at 180° C.). 106 parts of titanium tetralactate are then added. The varnish obtained is used to enamel 0.5 mm copper wire on a conventional wire-enameling machine (oven length 2.50 m, oven temperature 460° C.).

The enameled wire was tested according to DIN No. 46,453:

| | | |
|---|---|---|
| Scorching time | 350° C. | 702 min |
| | 370° C. | 352 min |
| | 390° C. | 201 min |
| | 420° C. | 37 min |
| Heat shock 1 × D | 300° C. | satisfactory |
| Heat/pressure | 290° C. | |

We claim:

1. A process for the preparation of aqueous thermosetting electrical insulating varnishes based on polyester-imides, which are obtained by condensing aromatic tricarboxylic acid monoanhydrides, diamines, diols and triols containing an isocyanurate ring, with or without aromatic dicarboxylic acids or their esterifiable derivatives, wherein
   (A) an aromatic tricarboxylic acid monoanhydride,
   (B) an aromatic diamine,
   (C) a triol containing an isocyanurate ring,
   (D) an aliphatic diol and
   (E) a cyclic trimerization product of a diisocyanate, whose free isocyanate groups are blocked, with or without
   (F) an aromatic dicarboxylic acid or its esterifiable derivatives
are co-condensed at from 120° to 240° C., the precondensate thus obtained is reacted—with or without addition of from 1 to 10% by weight, based on polyester-imide precondensate, of a polar organic solvent boiling above 100° C. under atmospheric pressure—with ammonia or an organic amine at from 50° to 200° C., the product is then diluted with fully demineralized water and, if appropriate, a water-soluble curing catalyst is added.

2. The process of claim 1, wherein component (C) is tris-(2-hydroxyethyl)-isocyanurate.

3. The process of claim 1 or 2, wherein component (E) is the cyclic trimerization product of toluylene diisocyanate, whose free isocyanate groups are blocked with phenol or cresol.

4. The process of claim 1 or 2, wherein, in the preparation of the precondensate, the components (A), (B), (C) and (F) are employed in the molar ratio of (A):(B):(C):(F) = 2.2 − 1.8/1/0.5 − 1.5/0 − 0.5.

5. The process of claim 1 or 2, wherein component (E) is employed in an amount of from 5 to 15% by weight, based on the total amount of components (A)+(B)+(C)+(F).

6. The process of claim 1 or 2, wherein component (D) is employed in an amount of from 20 to 200% by weight, based on the total amount of components (A)+(B)+(C)+(E)+(F).

7. The process of claim 1 or 2, wherein water formed in precondensate formation, blocking agents split off and excess diol are removed by distillation.

8. An electrical insulating varnish which is useful as a wire enamel or impregnating varnish and is prepared by a process as set forth in claim 1 or 2.

9. An electrical insulating varnish which is useful as a wire enamel or impregnating varnish and is prepared by a process as set forth in claim 3.

10. An electrical insulating varnish which is useful as a wire enamel or impregnating varnish and is prepared by a process as set forth in claim 4.

11. An electrical insulating varnish which is useful as a wire enamel or impregnating varnish and is prepared by a process as set forth in claim 5.

12. An electrical insulating varnish which is useful as a wire enamel or impregnating varnish and is prepared by a process as set forth in claim 6.

13. An electrical insulating varnish which is useful as a wire enamel or impregnating varnish and is prepared by a process as set forth in claim 7.

* * * * *